United States Patent
Rawat

(10) Patent No.: US 7,618,079 B2
(45) Date of Patent: Nov. 17, 2009

(54) WINDSHIELD SUNSHADE

(76) Inventor: Prem Pal Singh Rawat, P.O. Box 4134, Malibu, CA (US) 90264

( * ) Notice: Subject to any disclaimer, the term of this patent is extended or adjusted under 35 U.S.C. 154(b) by 237 days.

(21) Appl. No.: 11/855,303

(22) Filed: Sep. 14, 2007

(65) Prior Publication Data

US 2009/0072573 A1 Mar. 19, 2009

(51) Int. Cl.
*B60J 7/00* (2006.01)
(52) U.S. Cl. .................... 296/97.7; 296/97.1
(58) Field of Classification Search ............... 296/97.7, 296/97.1
See application file for complete search history.

(56) References Cited

U.S. PATENT DOCUMENTS

| | | | |
|---|---|---|---|
| 4,577,619 A | 3/1986 | Howe | |
| 4,784,215 A | 11/1988 | Sing | |
| 4,986,343 A | 1/1991 | Sing | |
| 5,042,550 A | 8/1991 | Yee | |
| 5,094,151 A | 3/1992 | Bernard | |
| 5,344,361 A | * 9/1994 | Matthias | 454/129 |
| 5,397,268 A | 3/1995 | Chang et al. | |
| 6,192,628 B1 | 2/2001 | Pinheiro et al. | |
| 6,224,749 B1 | 5/2001 | Gupta et al. | |
| 6,672,954 B2 | 1/2004 | Shtanko | |

FOREIGN PATENT DOCUMENTS

| | | |
|---|---|---|
| CN | 2485988 | 4/2002 |
| CN | 2788625 | 6/2006 |
| DE | 3721616 | 3/1988 |
| GB | 2217762 | 11/1989 |
| JP | 60261725 | 12/1985 |
| JP | 01192990 | 8/1989 |

* cited by examiner

*Primary Examiner*—Joseph D Pape
(74) *Attorney, Agent, or Firm*—Design IP

(57) ABSTRACT

A sunshade for an inner surface of a windshield comprised of an open-weave and air permeable fabric. At least one air-moving device is also provided to circulate air into and out of the gap between the sunshade and a windshield against which the sunshade is installed.

20 Claims, 4 Drawing Sheets

WINDSHIELD SUNSHADE

FIELD OF INVENTION

This invention relates to an improved windshield sunshade.

BACKGROUND

Conventional windshield sunshades typically comprise solid cloth, film panels or solid material blinds. Sunshades of these types are designed to reflect sunlight and prevent it from shining onto interior surfaces of a vehicle. One unfortunate side effect of conventional sunshades is a localized heat build up between the sunshade and the windshield. This heat buildup can be particularly problematic in aircraft applications where such heat buildups can cause windshield delamination, which is very costly to repair.

The prior art also teaches use of electric fans to circulate air within the interior of a vehicle, or to circulate air into the vehicle through an open window. Such fans are not, however, effective for obviating the heat buildup between a sunshade and non-opening windshield.

SUMMARY OF THE INVENTION

In one respect, the invention comprises a sunshade for an inner surface of a windshield. The sunshade preferably includes at least one panel having an air-permeable fabric pane, a frame and a spacing element. The frame is preferably connected to the fabric pane and is biased to hold the fabric pane in an extended position. The spacing element is adapted to maintain a gap between the fabric pane and the inner surface of the windshield. At least one air-moving device is also provided. Each air-moving device is configured to circulate air into or out of the gap.

In another respect, the invention comprises a covering substantially all of the inner surface of a windshield with a sunshade that comprises an open-weave fabric, maintaining a gap between the inner surface of the windshield and the open-weave fabric and operating at least one air-moving device to circulate air into and/or out of the gap.

In yet another respect, the invention comprises a sunshade for an inner surface of an aircraft windshield including a plurality of windshield sections. The sunshade includes a plurality of panels, each of the plurality of panels comprising an open-weave fabric pane having a perimeter. The sunshade also including a frame that extends around the perimeter of the fabric pane and is connected to the fabric pane and a spacing element. Each of the plurality of panels has an installed position in which each of the plurality of panels is positioned in close proximity to the inner surface of the windshield and covers substantially all of one of the plurality of windshield sections. The spacing element is positioned to maintain a gap between the inner surface of the windshield and the fabric pane. At least one air-moving device is also provided, each being configured to circulate air into or out of the gap.

BRIEF DESCRIPTION OF THE DRAWINGS

The present invention will hereinafter be described in conjunction with the appended drawing figures wherein like numerals denote like elements.

FIG. 2A is an exploded/enlarged view of a sunshade panel connector;

FIG. 3A shows details of the perimeter edge of a sunshade panel; and

DETAILED DESCRIPTION OF A PREFERRED EMBODIMENT

Figure 1:
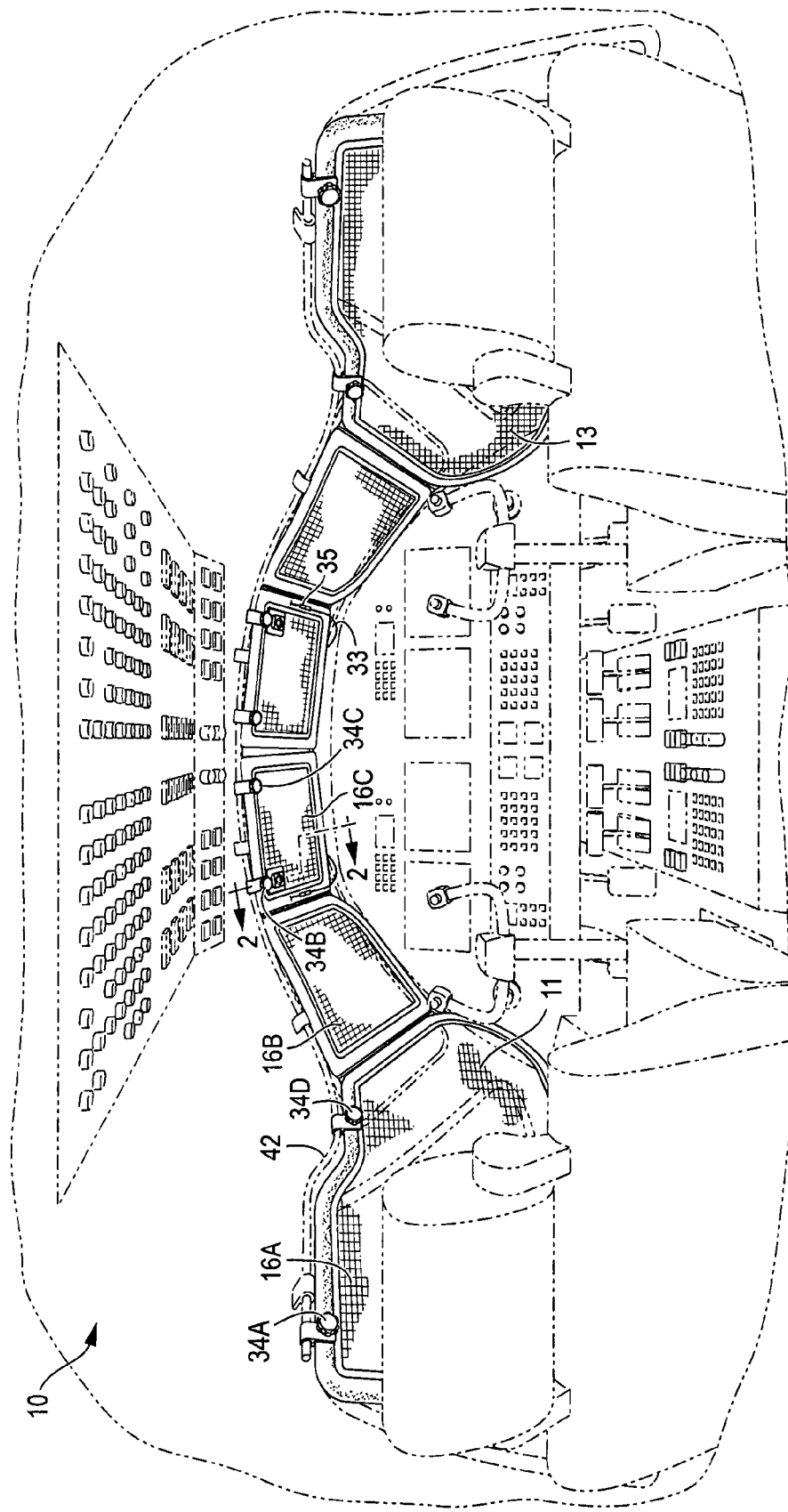
FIG. 1 is a view of a sunshade system in place in an aircraft cockpit.

FIG. 1 shows a preferred embodiment of the present invention, a sunshade 10, which is designed to be removably installed on the inside of the windshield of an aircraft. It should be noted that the sunshade 10 could be used in other applications, such as motor vehicle windshields, yacht windshields, and office building windows, for example.

In this embodiment, the sunshade 10 consists of two sections, left section 11 and right section 13, which are mirror images of each other and are each composed of three linked panels 16A, 16B & 16C. Therefore, a total of six panels are provided, each of which roughly corresponds in size and shape to one of the six panels of the aircraft windshield.

In this embodiment, the sunshade panels 16A, 16B, 16C each attach to a rod 42 with connectors 34A, 34B, 34C & 34D. The presence of the rod 42 in many aircraft cockpits provides a convenient means for securing the sunshade panels 16A, 16B, 16C in an installed position. Alternatively, any other conventional connecting means could be used or a friction fit could be relied upon to keep the sunshade panels 16A, 16B, 16C in position against the windshield.

Figure 2:
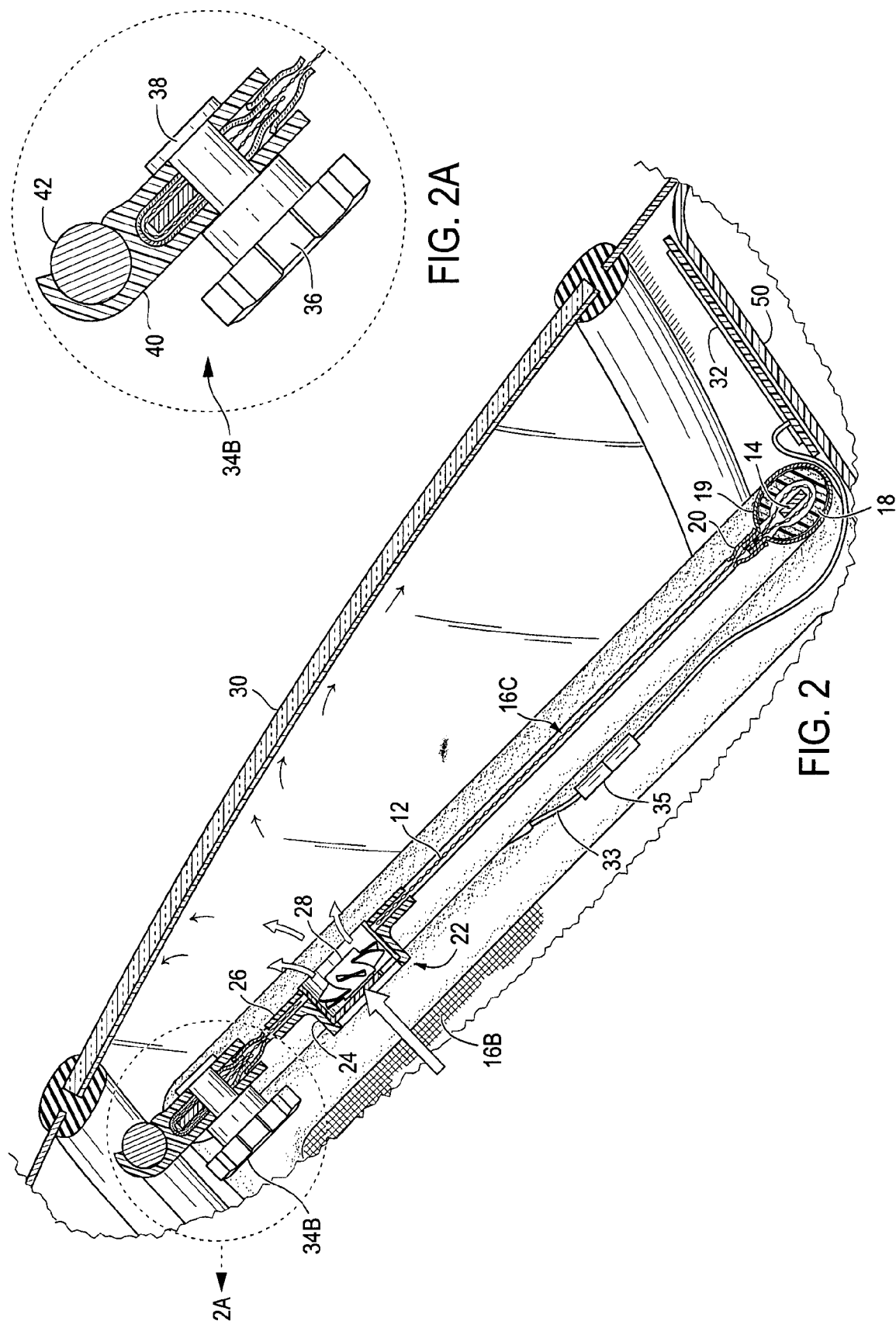
FIG. 2 is a cross-section of a sunshade panel and aircraft windshield.

FIG. 2 shows a cross-section of a sunshade 10 panel 16C. The other panels 16A, 16B are similarly constructed. The panel 16C has a spring steel frame 14 over which a fabric pane 12 is stretched. A spacing element 18 covers the fabric around the perimeter of the frame 14 and provides padding that prevents the frame 14 from scratching parts of the aircraft. A soft fabric cover 19 envelopes the spacing element 18 and are retained by a heavy fabric tape 20 which is sewn in place. The frame 14 may be made of spring steel, a titanium rod or any other suitable material depending upon the size and shape of the specific panel. The preferred fabric used for pane 12 is open weave, air permeable and solar reflective on at least one side. Style 1000 SheerWeave® shading fabric, manufactured by Phifer Wire Products, Inc., is an example of a suitable material. In this embodiment, the spacing element 18 is a flexible neoprene material having an open circular cross-sectional shape. Alternatively, the spacing element 18 could be made of any pliable semi-rigid material. Many of the details of panel 16C are also shown in FIGS. 3 and 3A.

The preferred embodiment illustrated in FIG. 2 also shows an air moving device 22 and a connector 34B. The air moving device 22 consists of an inner housing 24, an outer housing 26 and a fan 28. The inner and outer housings 24 and 26 are like shaped polymer components bonded with a suitable adhesive to the panel 16C fabric pane 12 over a circular cutout. The housings 24 & 26 provide a mounting structure for the fan 28 and combined with the hole in pane 12, an air movement conduit. Fan 28 is preferably powered by one or more photoelectric cells 32.

FIG. 2A is an enlarged view of the connector 34B in FIG. 2. In this embodiment the connector is designed to attach the panel 16C to rod 42 which is standardly present in specific aircraft cockpits. The details of the connector 34C will change depending upon the intended end use of the sunshade 10. Alternate means of attachment, such as hook and loop fasteners, friction fit or other types of connectors selected for suitability in the application environment could be used. This version connector 34B includes a knob 36, fastener 38 and clip 40. The fastener 38 has external threads sized to match the internal threads in knob 36. Fastener 38 could be a metallic or polymer part. Knob 36 is an injection molded polymer such as polystyrene, polypropylene or polycarbonate, die cast aluminum or other suitable material. Clip 40 is injection molded from a non-brittle polymer to allow its open section to compress and retain the cover 19, spacing element 18 and fabric pane 12 tightly over the frame 14 by tightening fastener 38 and knob 36. The clip 40 is shaped to snap over rod 42 and retain panel 16C in its operational position.

Figure 3:
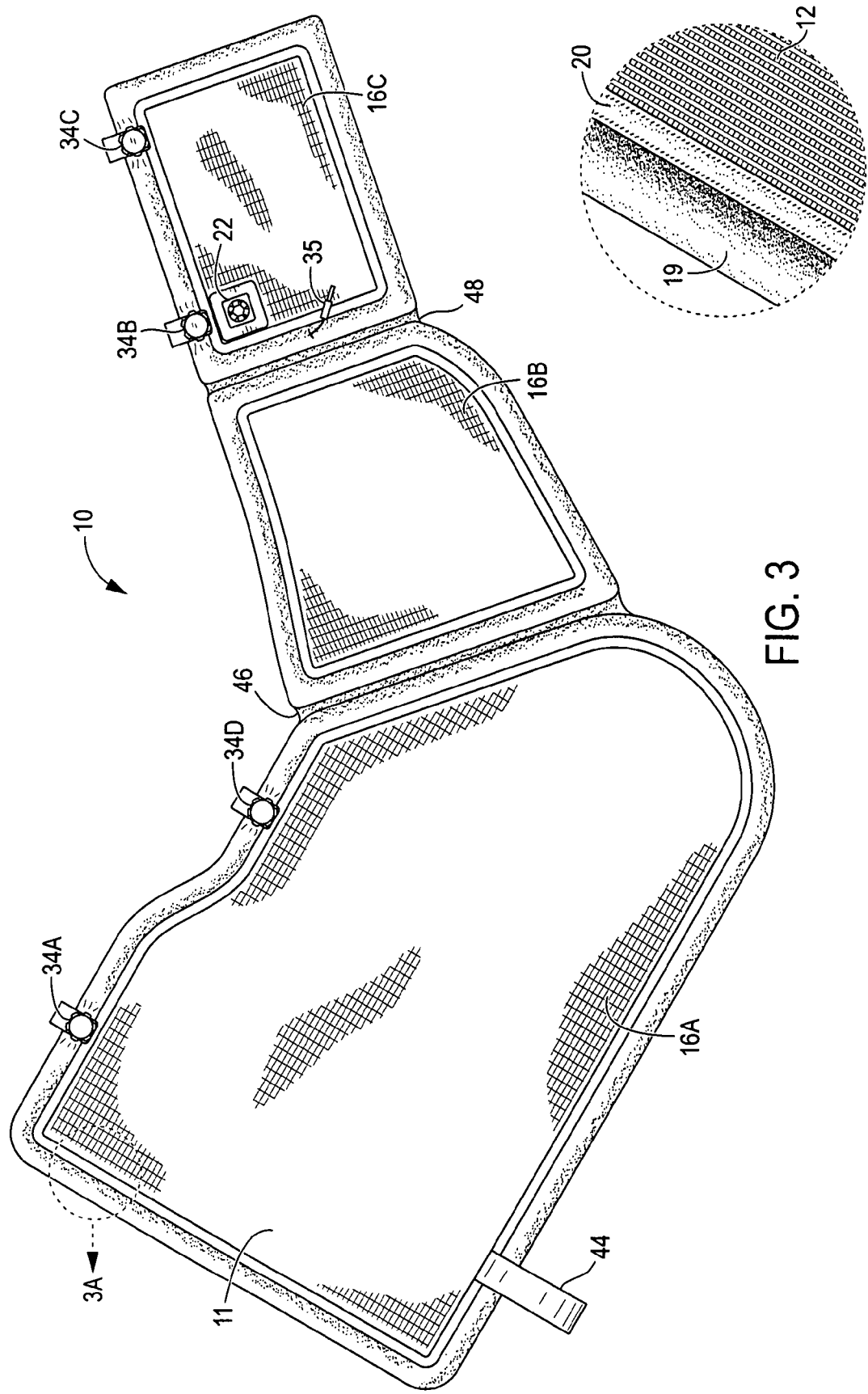
FIG. 3 is a perspective view of a multi-panel sunshade.

FIG. 3 illustrates in more detail this embodiment of a sunshade 10 system. The sunshade 10 is composed of three interlinked panels 16A, 16B & 16C. As shown in detail in FIG. 2, each of the panels 16A, 16B & 16C is constructed with a frame 14 to extend and maintain the shape of the fabric pane 12 and a spacing element 18 and heavy cloth cover 19 extending around the perimeter of the frame. The fabric panel 12 and cloth cover 19 are sewn together over the frame 14 using tape 20 on both sides trapping spacing element 18. The panels 16A, 16B & 16C are joined at fold lines 46, 48 forming a sunshade 10 system that covers a plurality of windshield panels. This embodiment also includes connectors 34A, 34B, 34C & 34D which provide for attachment of the panels 16A & 16C and thereby the sunshade 10 system to the existent rod 42 shown in FIGS. 1 & 2. Panel 16C shows one air movement device 22 to circulate air into or out of the gap between the sunshade 10 and the windshield when positioned as shown in FIG. 2. Panel 16A includes a pull down hook 44. In this embodiment the pull down hook 44 is made of elastic material, sewn into the perimeter package of the panel 16A and is intended to be looped over a fixed object in the cockpit, such as the flashlight provided in the cockpit of many Lear jets.

Figure 4:
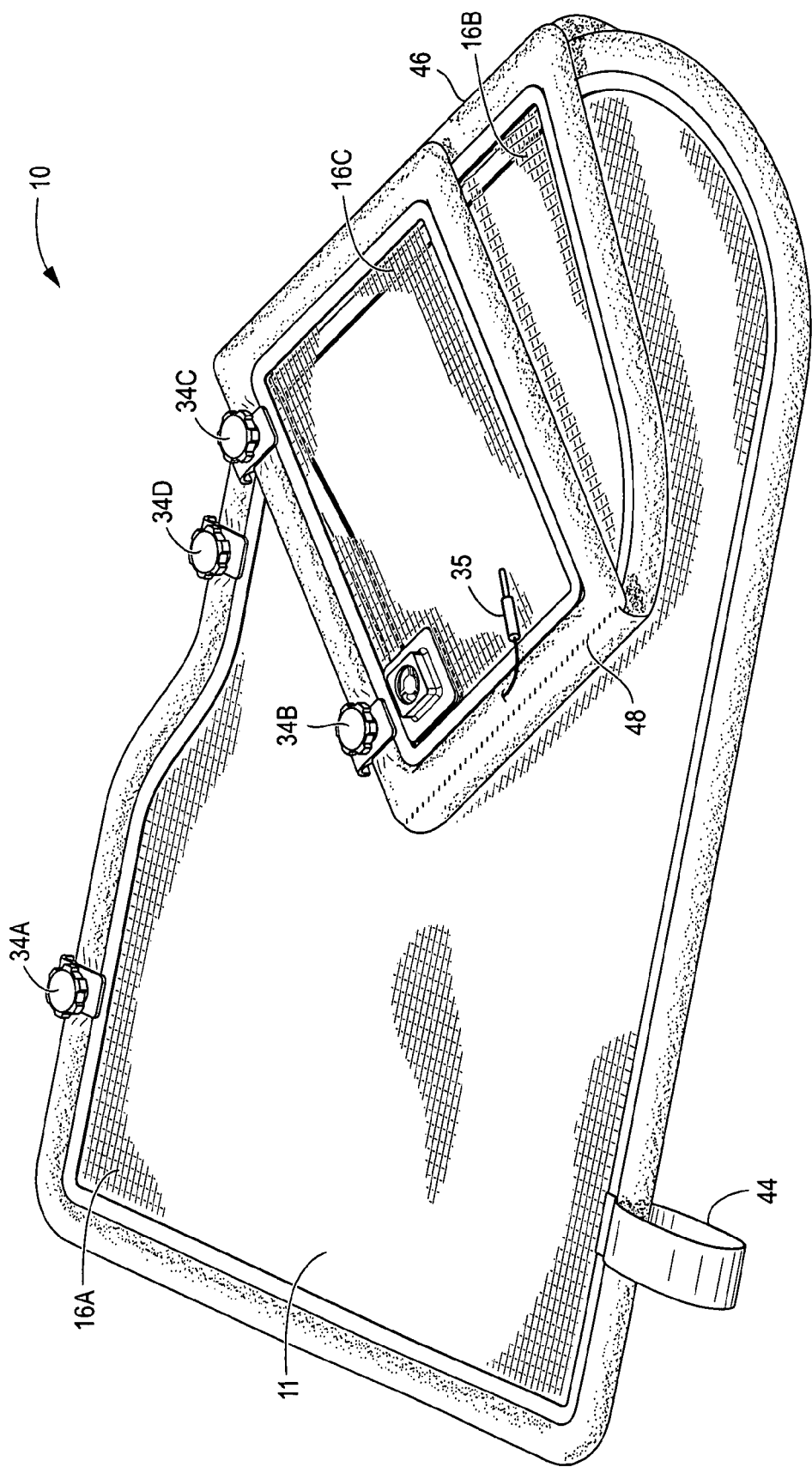
FIG. 4 is a perspective view of a multi-panel sunshade folded.

In FIG. 4, the previously described sunshade 10 is shown in compact form by folding panels 16B & 16C along fold lines 46 and 48 respectively. This allows for easier storage and handling of the sunshade 10 and can be applied to a sunshade 10 system with other numbers of panels.

Referring again to FIG. 1, this embodiment of the sunshade 10 is installed in the cockpit of an aircraft. The left half of the sunshade 10, as previously described, consists of three panels 16A, B & C, containing connectors 34A, B & C. At least one air moving device 22, shown more clearly in FIG. 2, is installed and connected to one or more of the photo-electric cells 32 using a wire 33 having a connector 35. When the aircraft is to be parked outside, the sunshade 10 would be opened from its compact/storage configuration shown in FIG. 4, oriented behind the corresponding windshield 30 panels and the connectors 34A, B & C are snapped onto the rod 42. The bottom of the sunshade 10 is held in position on the aircraft dashboard 50 by the friction of the cloth cover 19 and resilience of spacing element 18. The spacing between the sunshade 10 and the windshield 30 may vary depending upon the expected ambient temperature, number of air moving devices 22 and the position of the photo-electric cells 32. The right half 13 of the sunshade 10 is the mirror of that described and installs in the same manner.

Once installed the outer solar reflective surface of sunshade 10 panels 16A, B & C will reflect a portion of the sunlight that penetrates the windshield. The air-permeable/open weave fabric of the panes 12 allows air circulation from the gap between the sunshade 10 and windshield 30 and the rest of the cockpit. This will reduce the tendency for localized hot spots in the gap. One or more air moving devices 22, when provided power from the photo-electric cells 32, is used to circulate air into and/or out of this gap and mix it with the air within the cockpit. This reduces the accumulation of high temperature air from the gap area and provides a normalized temperature within the cockpit. This reduction of temperature in the gap will reduce the possibility of de-lamination of the windshield and damage to other components due to excessive heat. In embodiments of the invention where more than one air moving device is provided, it is preferable to configure one device to pull air into the gap and one to pull air out of the gap.

The sunshade 10 with photo-electric cell 32 driven air moving devices 22 would tend to be self regulating as the need for air circulation and gap temperature reduction would be the greatest when the impinging sunlight is at its strongest. This should correspond with output of the photo-electric cells 32 and the delivery of the air moving device 22.

To remove the left side 11 of the sunshade 10, the air moving device 22 is disconnected from the photo-electric cell 32, connectors 34A, B & C are removed from the rod 42 and the panels 16A, B & C are lifted away from the windshield and folded into their compact form to be stored in a protective, padded bag, not shown. The same procedure is followed for the right side 13.

Although the invention has been described in terms of various embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A sunshade for an inner surface of a windshield, the sunshade comprising:
    at least one panel comprising an air-permeable fabric pane, a frame and a spacing element, the frame being connected to the fabric pane and being biased to hold the fabric pane in an extended position, the spacing element being adapted to maintain a gap between the fabric pane and the inner surface of the windshield; and
    at least one air-moving device, each of the at least one air-moving device being configured to circulate air into or out of the gap.

2. The sunshade of claim 1, wherein the at least one air-moving device comprises first and second air-moving devices, the first air-moving device being adapted to draw air into the gap and the second air-moving being adapted to draw air out of the gap.

3. The sunshade of claim 1, further comprising at least one photo-electric cell that provides electric current to at least one air-moving device.

4. The sunshade of claim 1, wherein the at least one air-moving device is attached to one of the at least one panel.

5. The sunshade of claim 1, wherein the at least one panel further comprises a fabric cover that envelops the frame.

6. The sunshade of claim 1, wherein the spacing element comprises padding that is wrapped around at least a portion of the frame.

7. The sunshade of claim 1, wherein the windshield comprises a plurality of windshield panels and the at least one panel comprises one panel for each of the plurality of windshield panels.

8. The sunshade of claim 1, wherein the windshield is part of a vehicle having an interior and the at least one panel further comprises a connector that removably secures the at least one panel to a fixed portion of the interior of the vehicle and in close proximity to the inner surface of the windshield.

9. The sunshade of claim 8, wherein the fixed portion of the interior of the vehicle comprises at least one rod located above the windshield.

10. The sunshade of claim 1, wherein the fabric pane comprises a fabric panel having an open weave.

11. The sunshade of claim 10, wherein the fabric pane comprises at least one side that is solar-reflective.

12. A method comprising:
covering substantially all of the inner surface of a windshield with a sunshade that comprises an open-weave fabric;
maintaining a gap between the inner surface of the windshield and the open-weave fabric; and
operating at least one air-moving device to circulate air into and/or out of the gap.

13. The method of claim 12, wherein the operating step comprises operating a first air-moving device that draws air into the gap and operating a second air-moving device that draws air out of the gap.

14. The method of claim 13, further comprising:
powering the at least one air-moving device with at least one photo-electric cell.

15. A sunshade for an inner surface of an aircraft windshield comprised of a plurality of windshield sections, the sunshade comprising:
a plurality of panels, each of the plurality of panels comprising an open-weave fabric pane having a perimeter, a frame that extends around the perimeter of the fabric pane and is connected to the fabric pane, and a spacing element, each of the plurality of panels having an installed position in which each of the plurality of panels is positioned in close proximity to the inner surface of the windshield and covers substantially all of one of the plurality of windshield sections, the spacing element being positioned to maintain a gap between the inner surface of the windshield and the fabric pane; and
at least one air-moving device, each of the at least one air-moving device being configured to circulate air into or out of the gap.

16. The sunshade of claim 15, wherein the at least one air-moving device comprises first and second air-moving devices, the first air-moving device being adapted to draw air into the gap and the second air-moving being adapted to draw air out of the gap.

17. The sunshade of claim 15, further comprising at least one photo-electric cell that provides electric current to at least one air-moving device.

18. The sunshade of claim 15, wherein the at least one air-moving device is attached to one of the at least one panel.

19. The sunshade of claim 15, wherein each of the plurality of panels is attached to at least one other of the plurality of panels.

20. The sunshade of claim 15, wherein the fabric pane comprises at least one side that is solar-reflective.

* * * * *